Oct. 11, 1955  K. L. SHRIDER ET AL  2,720,621
ELECTRIC MOTOR CONTROL BY DUAL FUNCTION RECTIFIER
Filed June 10, 1950

INVENTORS.
KENNETH L. SHRIDER &
JAY W. PICKING
BY
Woodling and Krost
atty.

United States Patent Office 2,720,621
Patented Oct. 11, 1955

2,720,621

ELECTRIC MOTOR CONTROL BY DUAL FUNCTION RECTIFIER

Kenneth L. Shrider and Jay W. Picking, Cleveland, Ohio, assignors to The Reliance Electric & Engineering Company, a corporation of Ohio Application June 10, 1950, Serial No. 167,356

12 Claims. (Cl. 318—345)

The invention relates in general to electrical systems for transferring energy between alternating and direct current networks and more particularly to such systems wherein a dual function is obtained.

An object of the invention is to provide unidirectional current conducting devices in an electrical system for transferring energy between alternating current and direct current networks wherein these devices have a dual function.

Another object of the invention is to provide one alternating current network and two direct current networks with unidirectional current conducting devices for transferring energy among these networks.

Another object of the invention is to use undirectional current conducting devices in circuit arrangements, such as rectifiers or inverters, wherein these devices transfer current between an alternating current network and a dynamoelectric machine. The dynamoelectric machine preferably has armature and field windings which make two direct current circuits connected by way of the unidirectional current conducting devices to the alternating current network.

Another object of the invention is to provide a rectifier system which has at least four unidirectional current conducting devices in a bridge or full-wave circuit with half the devices controllable and the other half uncontrolled, and wherein the uncontrolled devices serve a dual function.

Another object of the invention is to provide in a rectifier system two direct current loads on one rectifier without the need for extra rectifier equipment or extra transformers.

Another object of the invention is to supply both the armature and field with rectified energy from one bridge or full-wave rectifier system.

A further object of the invention is to supply full-wave rectified energy to a direct current armature winding and to supply half-wave energy to the field winding of a direct current machine from the same rectifier system.

Figure 1:
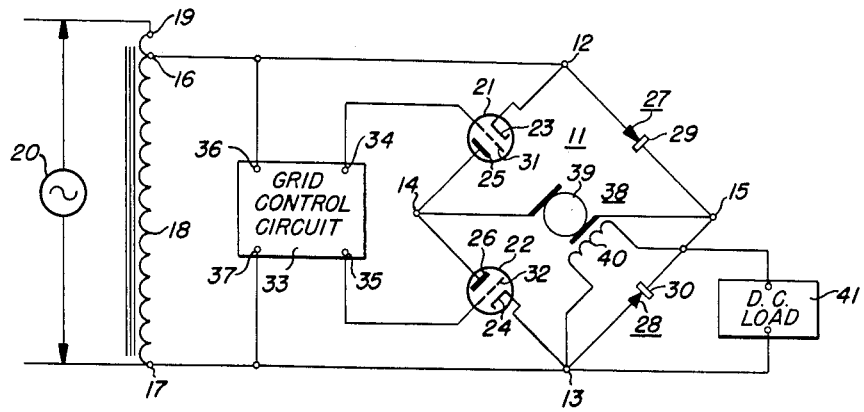
Figure 2:
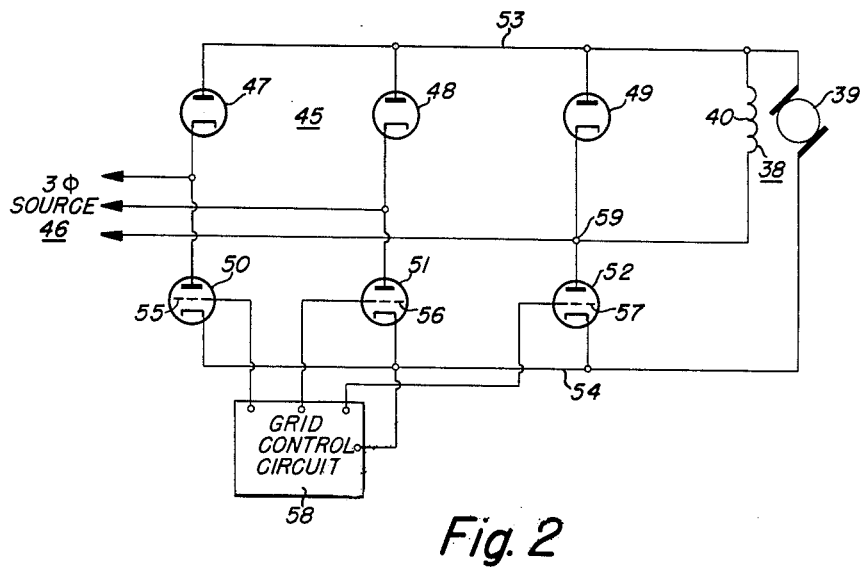

Other objects and a fuller understanding of the invention may be had by referring to the following description and claims, taken in conjunction with the accompanying drawing, in which:

Figure 1 is a schematic diagram of a full-wave bridge circuit supplying full-wave energy to a direct current armature and half-wave energy to the field of the direct current machine; and Figure 2 is a three phase full-wave rectifier system for a direct current armature which also supplies half-wave rectified energy to the field of this direct current machine.

The Figure 1 shows a rectifier system 11 having first and second input terminals 12 and 13 and first and second output terminals 14 and 15. The input terminals 12 and 13 are connected to a tap 16 and a first end terminal 17 of an autotransformer 18. The autotransformer 18 has a second end terminal 19 and two end terminals 17 and 19 are adapted to be connected to an alternating current source, shown by the reference character 20.

The rectifier system 11 includes four unidirectional current conducting devices in a full-wave or bridge rectifier system which includes a first and a second controllable rectifier 21 and 22. These rectifiers 21 and 22 may be any form of unidirectional current conducting device which is controllable in a characteristic thereof, such as impedance. They have been shown as triodes having the cathodes 23 and 24 thereof connected to the input terminals 12 and 13. These triodes 21 and 22 have anodes 25 and 26 connected to the first output terminal 14. Also connected in the rectifier system 11 are first and second uncontrolled rectifiers 27 and 28 having the cathodes 29 and 30 thereof connected to the second output terminal 15. The triodes 21 and 22 have control elements such as grids 31 and 32. A grid control circuit 33 is shown as a labeled rectangle and depicts any common form of grid control circuit for controlling the triodes 21 and 22. This grid control circuit 33 has first and second terminals 34 and 35 connected to the grids 31 and 32, respectively, and also has third and fourth terminals 36 and 37 connected to the cathodes 23 and 24, respectively.

The four unidirectional current conducting devices 21, 22, 27 and 28 are used to transfer or transform energy between an alternating current network, such as the alternating current source 20 and a direct current network shown as a direct current dynamoelectric machine 38. In this embodiment of Figure 1 the dynamoelectric machine 38 is shown as a direct current motor having an armature 39 and a field winding 40. The armature 39 is connected across the output terminals 14 and 15 of the rectifier system. The field winding 40 is connected across the terminals 13 and 15 of the rectifier system. Also connected across these same terminals 13 and 15 is a direct current load 41.

The operation of the energy transfer system shown in Figure 1 is a conventional circuit as far as supplying rectified energy to the motor armature 39 is concerned. The rectifier system 11 having four rectifier tubes in a bridge circuit supplies rectified alternating current energy to the motor armature 39 in a manner to make the left side of the armature negative relative to the right side thereof. There are two paths provided between the input terminals 12 and 13, and these two paths are used on opposite half cycles of the alternating current input. For one half cycle of the alternating current cycle the rectifiers 23 and 21 will pass current through the motor armature 39 from right to left. For the next half cycle of the alternating current cycle the rectifiers 27 and 22 will pass current through the motor armature 39 from right to left. It will thus be noted that the motor armature is supplied with pulsating direct current and that the two paths each have a controllable rectifier, namely, the rectifiers 21 and 22. The grid control circuit 33 depicts any conventional form of control circuit which may govern or regulate the amount of direct current supplied to the motor armature 39. These rectifiers 21 and 22 may be gas filled to pass large amounts of current which may be necessary in large motors.

The invention relates particularly to means for providing the direct current energization to the motor field winding 40 without providing any extra equipment over that necessary for the energization of the armature 39. The conventional circuit arrangement is to provide a center tapped transformer across the alternating current source 20 or across the terminals 16 and 17 of the autotransformer 18. This center tapped transformer would supply full-wave energy through two rectifier tubes to a motor field winding. In the instant invention the motor field winding 40 is supplied with rectified energy by means of the uncontrolled rectifier 27. This is a half-wave rectifier system, and since the motor field winding 40 is inductive the rectifier 28 acts as a back rectifier or blocking rectifier to carry the current caused by the induced E. M. F. The back rectifier 28 permits a continuous current flow through the field winding 40 even though it is not the proper half cycle of the alternating current input to pass current through the rectifier 27. This, in effect, gives a current through the motor field winding 40 which is practically identical to that current which would flow through the field winding were it to be supplied from a full-wave rectifier.

The direct current load 41 has been shown as paralleled across the field winding 40 and this direct current load may be one of many types of loads, whether resistive, inductive or capacitive in characteristic, and may be used for a control voltage or a reference voltage source for the dynamoelectric machine 38 or also may be used for any other direct current load purpose unconnected with the operation of the motor 38.

The Figure 2 shows a bridge or full-wave rectifier system 45 operable from a three phase alternating current source 46. The full-wave rectifier system 45 includes first, second and third uncontrolled rectifiers 47, 48 and 49 and first, second and third controllable rectifiers 50, 51 and 52. The anodes of the uncontrolled rectifiers 47, 48 and 49 have been shown as connected together to a first output lead 53, and the cathodes of the controllable rectifiers 50, 51 and 52 have been shown as connected together to a second output lead 54. The cathodes of the uncontrolled rectifiers 47, 48 and 49 are connected to the anodes of the controllable rectifiers 50, 51 and 52, respectively. The three leads from the three phase source 46 are connected to the anodes of the controllable rectifiers 50, 51 and 52, respectively. The controllable rectifiers 50, 51 and 52 have grids or control elements 55, 56 and 57 and these are connected to terminals of a grid control circuit 58. This grid control circuit 58 also has a connection to the common cathodes of the controllable rectifiers at the output lead 54.

The output leads 53 and 54 are connected to the armature 39 of the direct current motor 38, and the field winding 40 of this direct current motor 38 is connected across the uncontrolled rectifier 49 between the output lead 53 and a terminal 59 which is connected to the cathode of the rectifier 49.

The rectifier system 45 operates in a similar fashion to the rectifier system 11 and the six rectifiers 47–52 supply full-wave rectified energy from the three phase source 46 to the motor armature 39 with the top of the motor armature being negative relative to the bottom thereof. The field winding 40 is supplied with half-wave pulses of rectified energy. The field winding 40 will only receive these half-wave pulses when the terminal 59 is positive relative to one of the other two leads from the three phase source 46. These half-wave pulses will come partly through the rectifier 47 and partly through the rectifier 48 with the rectifier 49 acting as the blocking rectifier in order to maintain a continuous current flow through the field winding 40. These rectifiers 47, 48 and 49, therefore, have a dual function in supplying direct current power to both the armature 39 and the field winding 40.

It will be noted that in the Figure 2 the negative terminals of the field winding 40 and armature 39 are interconnected, whereas in the Figure 1 the positive terminals thereof are interconnected. This difference is because of the different types of connection of the rectifiers in the circuits of Figures 1 and 2. In Figure 2 the cathodes of the controllable rectifiers 50, 51 and 52 are interconnected. This makes for certain advantages, namely, the grid control circuit 58 can be simplified since the cathodes are all at a common potential, and hence the voltage applied to each of the three grids 55, 56 and 57 need only be a voltage with reference to a common point of reference potential. In the circuit of Figure 1 the cathodes 23 and 24 of the controllable rectifiers 21 and 22 are at different alternating current potentials, and hence the grid control circuit 33 is more complicated in order to establish the grid-cathode bias separately for each of the controllable rectifiers. In the circuit of Figure 1 the cathodes 23 and 24 could be interconnected, namely, all four tubes reversed, to make a simpler grid control circuit, just as is shown in the circuit of Figure 2. For the circuit of Figure 2, it will be seen that since the cathodes of the controllable rectifiers 50, 51 and 52 are interconnected, a multianode rectifier might be used. This could offer further simplifications and economies. In the circuit of Figure 1, the autotransformer 18 has been shown and is another advantage of the invention, since it is not necessary to provide any transformer with a center tap connection, and actually it is not necessary to provide even an autotransformer if the voltage of the alternating current source 20 is of suitable magnitude in order to supply the direct current motor 38 through the rectifier system 11.

Although the invention has been described in its preferred form with a certain degree of particularity, it is understood that the present disclosure of the preferred form has been made only by way of example and that numerous changes in the details of circuit construction and the combination and arrangement of circuit elements may be resorted to without departing from the spirit and the scope of the invention as hereinafter claimed.

What is claimed is:

1. In an electrical system for transforming energy between alternating current and direct current networks, said direct current network including first and second direct current circuits, the provision of at least first, second, third and fourth unidirectional current conducting devices, means for connecting said unidirectional current conducting devices between said alternating current network and said first direct current circuit in at least two paths for full-wave transfer of energy therebetween, half of said unidirectional current conducting devices being controllable and the other half being uncontrollable, a controllable device being in each of said paths to control the current to said first direct current circuit, and means for connecting said second direct current circuit across one of said unidirectional current conducting devices to be in series across said alternating current network with one of said uncontrollable unidirectional current conducting devices and thus be uncontrolled by either of said controllable devices.

2. In an electrical system for transforming energy between alternating current and direct current networks, said direct current network including first and second direct current circuits, the provision of at least first, second, third and fourth unidirectional current conducting devices, first and second terminals on said first direct current circuit, at least third and fourth terminals on said alternating current network, a first path including said first and second unidirectional current conducting devices and extending from said third to said fourth terminal through said first and second terminals, a second path including said third and fourth unidirectional current conducting devices and extending from said third to said fourth terminal through said first and second terminals, half of said unidirectional current conducting devices being controllable and the other half being uncontrollable, a controllable device being in each of said paths to control the current to said first direct current circuit, and means for connecting said second direct current circuit across one of said unidirectional current conducting devices to be in series across said third and fourth connections with one of said uncontrollable unidirectional current conducting devices and thus be uncontrolled by either of said controllable devices.

3. In an electrical system for transforming energy between alternating current and direct current networks, said direct current network including first and second direct current circuits, the provision of at least first, second, third and fourth unidirectional current conducting devices, first and second terminals on said first direct current circuit, at least third and fourth terminals on said alternating current network, a first path including said first and second unidirectional current conducting devices and extending from said third to said fourth terminal through said first and second terminals, a second path including said third and fourth unidirectional current conducting devices and extending from said third to said fourth terminal through said first and second terminals, half of said unidirectional current conducting devices being controllable and the other half being uncontrollable, a controllable device being in each of said paths to control the current to said first direct current circuit, and means for connecting said second direct current circuit across one of said uncontrolled unidirectional current conducting devices to be in series across said third and fourth terminals with another of said uncontrollable unidirectional current conducting devices and thus be uncontrolled by either of said controllable devices.

4. In an electrical system for transferring energy between alternating current and direct current networks, said direct current network including a dynamoelectric machine having armature and field windings, the provision of at least first, second, third and fourth unidirectional current conducting devices, means for connecting said unidirectional current conducting devices between said alternating current networks and one of said windings in at least two paths for full-wave transfer of energy therebetween, half of said unidirectional current conducting devices being controllable and the other half being uncontrollable to control the current to said one of said windings, and means for connecting the other of said windings across one of said unidirectional current conducting devices to be in series across said alternating current network with one of said uncontrollable unidirectional current conducting devices and thus be uncontrolled by either of said controllable devices.

5. In an electrical system for transferring energy between alternating current and direct current networks, said direct current network including a dynamoelectric machine having armature and field windings, the provision of at least first, second, third and fourth unidirectional current conducting devices, means for connecting said unidirectional current conducting devices between said alternating current network and said armature in at least two paths for full-wave transfer of energy therebetween, half of said unidirectional current conducting devices being controllable and the other half being uncontrolled, a controllable unidirectional current conducting device being in each of said paths to control the current to said armature, and means for connecting said field winding across one of said unidirectional current conducting devices to be in series across said alternating current network with one of said uncontrolled unidirectional current conducting devices and thus be uncontrolled by either of said controllable devices.

6. In an electrical system for transferring energy between alternating current and direct current networks, said direct current network including a dynamoelectric machine having armature and field windings, the provision of at least first, second, third and fourth unidirectional current conducting devices, first and second terminals on said armature, at least third and fourth terminals on said alternating current network, a first path including said first and second unidirectional current conducting devices and extending from said third to said fourth terminal through said first and second terminals, a second path including said third and fourth unidirectional current conducting devices and extending from said third to said fourth terminal through said first and second terminals, half of said unidirectional current conducting devices being controllable and the other half being uncontrollable, a controllable device being in each of said paths to control the current to said armature, and means for connecting said field winding across one of said uncontrollable unidirectional current conducting devices to be in series across said third and fourth terminals with another of said uncontrollable unidirectional current conducting devices and thus be uncontrolled by either of said controllable devices.

7. An electrical energization system for a direct current motor having an armature winding and a field winding, comprising, at least first, second, third and fourth rectifiers connected in a full-wave rectifier circuit having an input and an output, means for connecting said input to an alternating current source, means for connecting said output to one of said windings, said first and second rectifiers being controllable to control the currents to said armature winding and said third and fourth rectifiers being uncontrollable, and means for connecting the other of said windings directly across one of said rectifiers to be in series across said input with one of said uncontrollable rectifiers and thus be uncontrolled by either of said controllable devices.

8. An electrical energization system for a direct current motor having an armature winding and a field winding, comprising, first, second, third and fourth rectifiers connected in a bridge circuit having an input and an output, means for connecting said input to an alternating current source, means for connecting said output to one of said windings, said first and second rectifiers being controllable to control the current to said one of said windings and said third and fourth rectifiers being uncontrollable, and means for connecting the other of said windings directly across one of said rectifiers to be in series across said input with one of said uncontrollable rectifiers and thus be uncontrolled by either of said controllable devices.

9. An electrical energization system for a direct current motor having an armature and a field winding, comprising, first, second, third and fourth rectifiers connected in a bridge circuit having an input and an output, means for connecting said input to an alternating current source, means for connecting said output to said armature, said first and second rectifiers being controllable to control the current to said armature and said third and fourth rectifiers being uncontrollable, and means for connecting said field winding directly across one of said rectifiers to be in series across said input with one of said uncontrollable rectifiers and thus be uncontrolled by either of said controllable devices.

10. An electrical energization system for a direct current motor having an armature and a field winding, comprising, first, second, third and fourth rectifiers connected in a bridge circuit having an input and an output, means for connecting said input to an alternating current source, means for connecting said output to said armature, said first and second rectifiers being controllable and being connected in opposition across said input to control the current to said armature, said third and fourth rectifiers being uncontrollable, and means for connecting said field winding directly across one of said third and fourth rectifiers to thus energize said field winding at a constant current independent of the controllable current to said armature.

11. In an electrical system for use with an alternating current circuit and a direct current circuit, first and second parts in said direct current circuit, a full wave converter connected to said alternating current circuit and to said first direct current circuit part for full wave transfer of energy therebetween, at least first and second unidirectional current conducting devices connected as part of said converter, said converter including at least one controllable unidirectional current conducting device to control the current flow through said first direct current circuit part, and circuit means for connecting said second direct current circuit part directly in shunt with said first unidirectional current conducting device and said alternating current circuit, said circuit means excluding said controllable unidirectional current conducting device to thus establish uncontrolled current flow in said second part independent of the controllable current in said first part.

12. In an electrical system for use with an alternating current circuit and a direct current circuit, first and second parts in said direct current circuit, a full wave converter connected to said alternating current circuit and to said first direct current circuit part for full wave transfer of energy therebetween, at least first and second unidirectional current conducting devices connected as part of said converter, said converter including at least one controllable unidirectional current conducting device to control the current flow through said first direct current circuit part, said first and second unidirectional current conducting devices being connected in opposition relative to said alternating current circuit, and means for connecting said second direct current circuit part effectively in series with said alternating current circuit and said first unidirectional current conducting device and directly in shunt with said second unidirectional current conducting device, said last named means excluding said controllable unidirectional current conducting device to thus establish uncontrolled current flow in said second part independent of the controllable current in said first part.

References Cited in the file of this patent

UNITED STATES PATENTS

| | | |
|---|---|---|
| 2,062,274 | Rees | Nov. 24, 1936 |
| 2,167,530 | Schneider | July 25, 1939 |
| 2,288,339 | Willis | June 30, 1942 |
| 2,545,989 | Burgwin | Mar. 20, 1951 |
| 2,558,086 | Herchenroeder | June 26, 1951 |
| 2,558,094 | King | June 26, 1951 |
| 2,572,824 | Wilkins | Oct. 23, 1951 |
| 2,601,002 | Picking | June 17, 1952 |
| 2,609,524 | Greene | Sept. 2, 1952 |